United States Patent [19]

Gau et al.

[11] 4,428,474
[45] Jan. 31, 1984

[54] APPARATUS FOR THE ALIGNMENT OF BOTTLES OR THE LIKE, PARTICULARLY LABELING MACHINES

[75] Inventors: George Gau, Obertraubling; Erwin Pesold, Regenstauf, both of Fed. Rep. of Germany

[73] Assignee: Krones Aktiengesellschaft Hermann Kronseder Maschinenfabrik, Worth, Fed. Rep. of Germany

[21] Appl. No.: 272,797

[22] Filed: Jun. 11, 1981

[30] Foreign Application Priority Data

Jun. 14, 1980 [DE] Fed. Rep. of Germany ....... 3022343

[51] Int. Cl.³ .............................................. B65G 47/24
[52] U.S. Cl. .................................... 198/394; 198/376; 198/377
[58] Field of Search ............... 198/376, 377, 394, 395, 198/379; 209/538, 540, 541, 545; 294/20, 21

[56] References Cited

U.S. PATENT DOCUMENTS

| | | | |
|---|---|---|---|
| 1,752,737 | 4/1930 | Grinnell | 294/21 |
| 2,528,860 | 11/1950 | Clark | 198/394 X |
| 3,451,523 | 6/1969 | Evans, Jr. | 198/394 |
| 3,610,398 | 10/1971 | Rice | 198/715 X |
| 3,776,584 | 12/1973 | Van Gerven | 294/21 |
| 4,168,773 | 9/1979 | Thiel et al. | 198/377 X |

FOREIGN PATENT DOCUMENTS 2740220  3/1979  Fed. Rep. of Germany ...... 198/394

*Primary Examiner*—John J. Love
*Assistant Examiner*—Paul A. Sobel
*Attorney, Agent, or Firm*—Wheeler, House, Fuller & Hohenfeldt

[57] ABSTRACT

A rotating radial unit has bottle receiving recesses on its periphery for accepting bottles from a linear conveyor. A pair of elements are mounted on the unit adjacent each receiver for moving towards and away from the receiver. A belt runs around rolls that are on both elements so portions of the belt grip a bottle on each side when the elements are moved toward each other automatically. A motor can drive the belt to rotate the gripped bottle as it is transported on the unit. A sensing device controls the motor to start and rotate the bottle and to stop when a marker on the bottle is rotated to a preferred orientation or alignment so a series of bottles will be aligned identically as they are released. The elements are automatically spread apart to release the grip of the belt on the bottle.

1 Claim, 2 Drawing Figures

APPARATUS FOR THE ALIGNMENT OF BOTTLES OR THE LIKE, PARTICULARLY LABELING MACHINES

BACKGROUND OF THE INVENTION

The invention relates to an apparatus for the alignment of bottles or the like such as might be required for placing labels on the bottles.

Various kinds of apparatus for the alignment of bottles are already known. They serve generally the purpose of bringing the markings present on the bottles as exactly as possible into a determined angular position, to fix the bottles in this position and then to transfer them to a subsequent treatment station where the bottles are provided, for example, at determined locations with labels.

In one known apparatus for the alignment of bottles, the bottles are set in rotation by means of a friction surface arranged stationarily on a rotating transporting radially extending unit and acting directly on the bottle periphery, until upon recognition of a marking on the bottle by means of a scanning device, spring-tensioned clamping jaws are pressed onto the bottle (German Laid Open Specification No. 17 61 150). The aligned bottle slides then until it is discharged from the transporting radial unit to the stationary friction surface. It is unfavorable in this connection, that the friction surface is still effective, after the braking or retarding of a bottle, to turn the bottle against the braking force of the clamping jaws. Under some operating conditions, this may result in the bottle already retarded or braked being rotated further a determined angular amount, and accordingly higher than desired deviations from the desired end position of the markings occur. A further disadvantage is that the amount of rotation of the individual bottles is a variable dependent upon the rate of rotation of the transporting radial unit. This leads to differing track alignment angles within the forced retardation time between the operation of the scanning device and the complete locking of a bottle when the apparatus is operated with different outputs and, hence, leads to some deviation from the desired end position of the markings.

In another known apparatus for the alignment of bottles with a rotating transporting radial unit, there are connected between the stationary friction surface and the bottles movable friction rolls coupled with the clamping jaws, said friction rolls being raised upon a closure of the clamping jaws from the friction surface and/or the bottles (German Laid Open Specification No. 27 40 220). In this manner, no after-rotation of the bottles is any longer possible after the locking. Unfavorable, however, as before is the different lagging angle within the retardation time up to complete locking of the bottles upon operation with different machine speeds or outputs.

In the case of a known apparatus of the type described first above, each friction element is a friction roll which is seated on the radially inwardly disposed side of the pocket or bottle receiving recess of the transporting radial unit and is connected directly with an individual braking motor or through a coupling-braking unit with a common operating motor for all friction rolls (German Laid Open Specification No. 25 17 443). By means of a guide member disposed stationarily on the periphery of the transporting radial unit, which former extends from the inlet- to the outlet-area, the bottles are held in the receivers of the transporting radial unit and pressed onto the elastic friction rolls. The guide member may indeed consist of material low in friction. However, it still exerts on the bottles sliding on it (on account of the required pressure force for the friction rolls after the locking of the bottle rotation and--upon operation with different outputs) a determined torsional or twisting moment, which on account of the relatively low braking effect of the friction rolls may lead to undesired rotation of the bottles. Particularly with high machine speeds or outputs, this torsional or twisting moment is not unappreciable, as here the pressure force on the guide member is still augmented by the centrifugal force taking effect on the bottles. In addition, on account of the unavoidable deviations in the dimensions and the form of the bottles, different surface-character of the bottles which are in contact with one another, unequal wear of the guide member and the friction rolls unpredictable friction conditions occur in practice, so the accuracy of alignment attainable with the known apparatus is usually not sufficient. The theoretical possibility of attaining through a corresponding disposition of the operating motor a speed of rotation of the bottles independent of the machine speed and therewith a constant lagging angle is not obtainable in practice.

SUMMARY OF THE INVENTION

The basic object of the invention is to furnish an apparatus which, independently of all operating conditions, particularly of the output and the friction conditions, achieves constant and accurate alignment of bottles.

In apparatus according to the invention, in the alignment area, on account of the holding of the respective bottles with a belt applied with a certain force, no abutment in form of a stationary guide member or the like which could exert a disturbing torsional or twisting moment on the bottes is necessary. Each belt is applied over a substantial circumferential portion of the bottle so that a large contact surface results. In this manner, during rotation as well as during locking of the bottles, a reliable gripping without slipping is attained independently of the machine output and any other friction conditions. Moreover, through the control of the guide rolls, an undisturbed entry and discharge of the bottles by the transporting radial unit is achieved. The apparatus, according to the invention, therefore permits a most uniform and exact alignment of bottles under all operating conditions.

A particularly exact alignment, even with very great variations in form and dimension of the bottles and with highest outputs is attained in accordance with a further feature of the invention in that the belts embrace the bottle in the alignment area like gripping tongs at two opposed peripheral areas. By selection of the pressure force, the gripping tongs formed by the belts act as a jaw brake that achieve positive locking of the bottles in the desired final position. The pressure force may be selected optimally by means of an elastic initial tensioning of the belts and/or by biasing the guide rolls resiliently.

Other advantages and further features of the invention which contribute to simplicity and reliability as well as to a reliable rotation and locking of the bottles will appear in the ensuing description and in the subsidiary claims. An illustrative embodiment of the invention will now be explained in greater detail in reference to the drawings.

DESCRIPTION OF A PREFERRED EMBODIMENT

Figure 1:
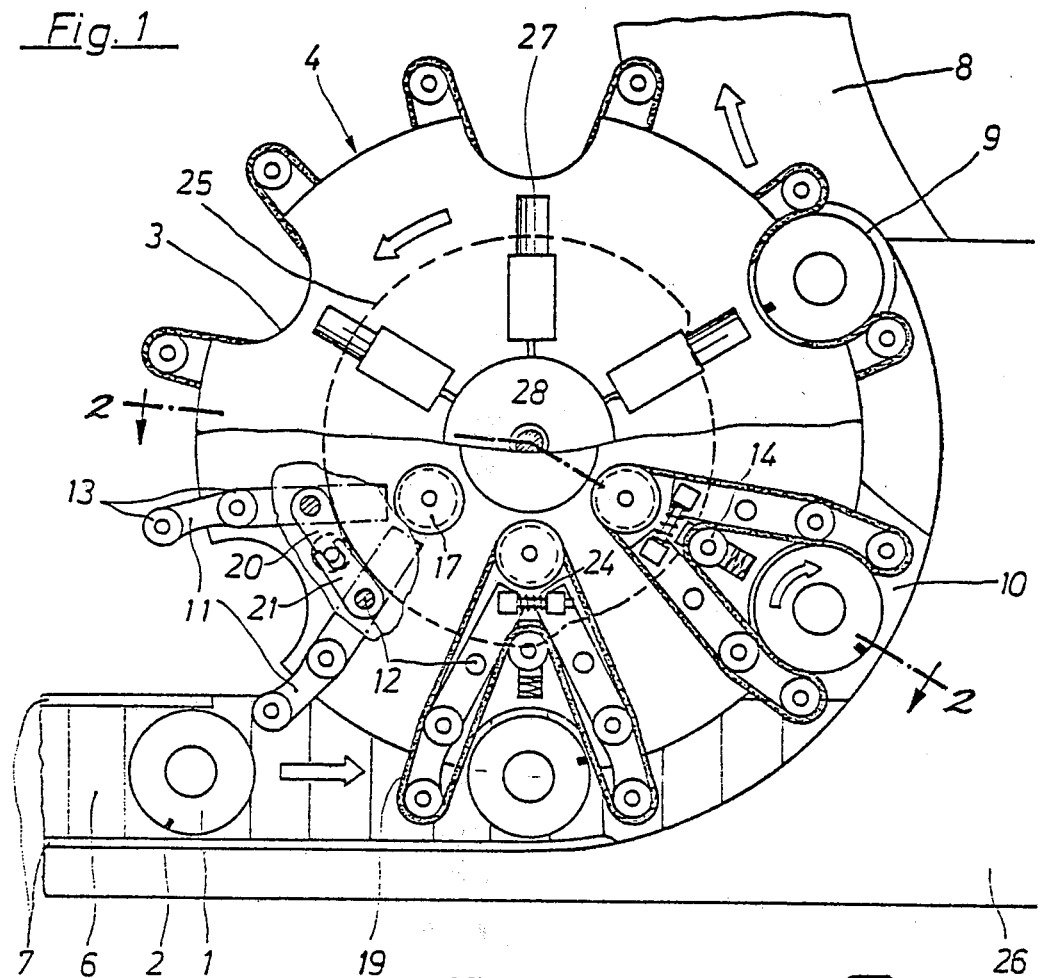
FIG. 1 shows the plan view of an apparatus for the alinement of bottles, partially in section.
Figure 2:
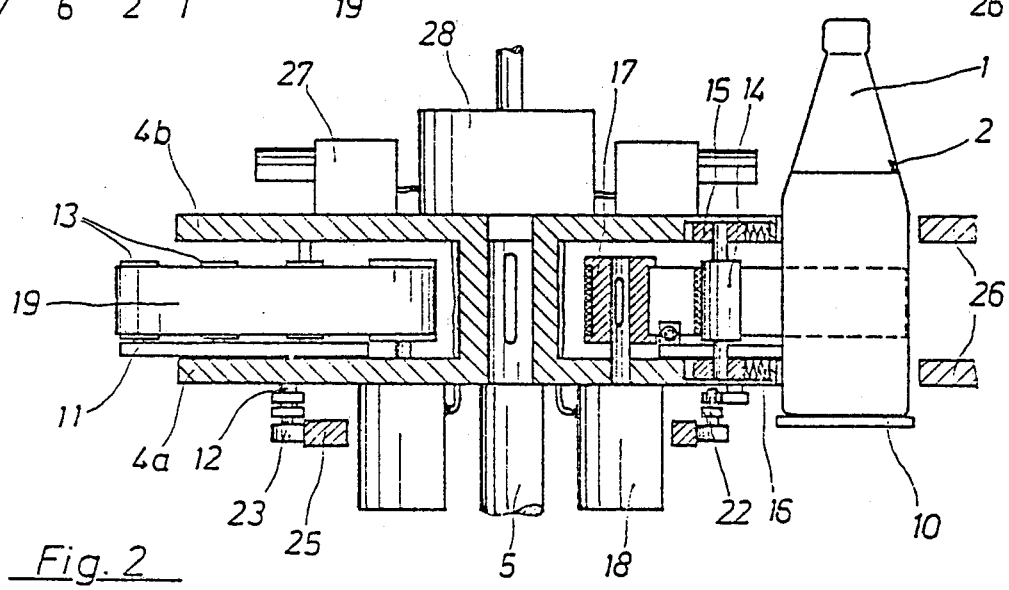
FIG. 2 is a section taken on a line corresponding to 2—2 in FIG. 1.

The apparatus according to FIGS. 1 and 2 serves to align upright round bottles 1 for beverages, which have at their peripheries an optically perceptible marking 2 in form of a black line on a bottleneck wrapper made of metal foil. The apparatus cooperates with a bottle labeling machine, shown only partially, in which labels are applied to the aligned bottles 1.

The apparatus has a transporting radial unit 4 equipped on its periphery with pocket-shaped receivers 3 or curved recesses for the bottles 1. The generally circular radial transport unit has a lower radial unit plate 4a and an upper radial unit plate 4b, which is positioned on a vertical shaft 5 of the labeling machine, said shaft being operable in the direction of the arrow. Associated with the transporting radial unit 4 which moves the bottles through an arc is a linear conveyor belt 6 having laterally spaced apart side rails 7. Conveyor belt 6 is driven in the direction of the arrow synchronously with the transporting radial unit, said belt introducing the bottles 1 to be aligned consecutively into the curved recesses or receivers 3 of the transporting radial unit 4. From the transporting radial unit 4, the alined bottles 1 pass to a bottle table 8 of the labeling machine, rotating in the direction of the arrow, synchronously to the transporting radial unit where they are pressed against curved plates 9 which orbit with table 8 and the bottles are also stabilized with centering bells, not shown. In the transition area between the conveyor belt 6 and the bottle table 8, the bottles 1 stand and slide on a stationary rail 10.

Each receiver 3 of the transporting radial unit 4 has associated therewith two essentially radially extending complementary double-armed levers 11, which are supported by means of pins 12 swingable on the lower star-plate 4a in the transporting radial unit. On the outer arm of each lever 11 are rotatably fixed two guide rolls 13 one of which lies radially outside and the other radially inside of the circle defined by the vertical mid-line of the bottles 1. The one of the two levers, 11, and its two guide rolls 13 lies—viewed in direction of rotation of the transporting radial unit 4—in front of the associated receiver 3, while the other lever 11 is positioned with its two guide rolls 13 behind the receiver 3. A further guide roll 14, which serves as a belt tensioning roller, is in each case rotatably arranged between the receiver 3 and the axis of rotation of the transporting radial unit 4. This guide roll 14 is mounted for rotation in members 15 which are radially slidable in corresponding recesses of the lower star-plate 4a and the upper star-plate 4b, and are urged radially inwardly by means of springs 16. A further guide roll 17 having greater diameter than roll 14 is seated between the guide roll 14 and the axis of rotation of the transporting radial unit 4. Guide roll 17 is fixed on the shaft of a brake motor 18 which is fixed on the lower side of the lower star-plate 4a. The axes of rotation of all guide rolls 13, 14 and 17 as well as the swivel axes of all levers 11 extend parallel to the axis of rotation of the transporting radial unit 4.

Extending over the six guide rolls 13, 14 and 17 associated with each receiver 3 is a tensioned and endless toothed belt 19. The outside of the belt is smooth and the side running on the roller is toothed. Belt 19 forms a double angle or a double-V, respectively, open radially to the outside. The legs of the in side of the V of the belt accommodate the receiver 3 between them. For the power transfer between the brake motor 18 and the toothed belt 19, at least the innermost guide roll 17 is correspondingly toothed, whereby the required belt tension is maintained by means of the spring-biased middle guide roll 14.

At the lower end of the pins 12 rigidly connected with the levers 11 and rotatably supported in the lower star-plates 4a are fixed cams 20 and 21. The cams 20 and 21 of a cooperating pair of levers 11 are aligned with one another at different positions of height. The lower-lying cam 20 is provided on its upper side with a pin 22 and on its lower side with a cam roller 23, while the higher-lying cam 21 has a recess engaging the pin 22. The two levers 11 for each receiver 3 are connected to move jointly with one another as a result of there being a compression spring 24 interposed between the levers. Compression spring 24 urges the outer arms of both levers 11 having the guide rolls 13 towards one another and the cam roller 23 radially inward, respectively, so that the latter abuts on and follows the shape of a stationary control cam 25. The control cam 25 forms, together with the cam roller 23 and the compression springs 24 the control device for the lever 11 with the guide roll 13, or for the toothed belt, 19, respectively. The control cam 25 is constructed in such manner that the bottle gripping tongs formed by the toothed belt 19 are opened in the bottle entry area of the transporting radial unit 4. The corresponding belt parts are at this time spread apart so far from one another that the bottles 1 may enter unhindered into the curved receiver 3. Subsequently the gripping tongs are closed by means of a corresponding drop in the guide cam 25, that is, the levers 11 are moved towards one another by means of the compression spring 24, whereupon the toothed belt 19 abuts curvedly at two oppositely disposed peripheral areas with a determined pressure force on the bottle 1. By means of the joint action of the springs 16 and the compression springs 24, the desired pressure force permits of being predetermined. Because of the arrangement of the movable guide rolls 13, the bottle 1 will be held solely by the deflections produced in the toothed belt 19 in the corresponding receiver 3, that is, the bottle cannot leave the receiver 3 in radial direction. The intake guide curve 26 of the labeling machine, arranged at the periphery of the transporting radial unit 4, is spaced from the movement path of the bottles 1 so that it, at least in the alignment area, does not come in contact with the bottles. In the discharge area of the transporting radial unit 4, as a result of a corresponding rise in the control cam 25, the outer arms of the lever 11 are again spread away from one another against the force of the compression spring 24, so that the toothed belt 19 releases the bottle 1 when the latter is tensioned between the orbiting curved plate 9 of the rotating bottle table 8 and the centering bell, not shown.

In the bottle alignment producing area of the transporting radial unit 4 lying between the intake area and the discharge area, that is, when the toothed belt 19 is pressed against the bottles, the alignment takes place in reference to the markings 1. For this purpose, at each receiver 3 of the transporting radial unit 4 a signal is sent to a control unit 28 rotating wih the transporting radial unit 4. This control unit 28 is provided with electric current through slip rings or contact rings, not visible, and controls each individual brake motor 18 in such manner that the motor starts up to drive the belt after the embrace of a bottle 1 in the intake area and thus through the guide roll 17 and the toothed belt 19 sets the bottle in rotation, until the associated reflex-light barrier 27 senses the marking 2. This stops and holds the brake motor 18 so the bottle 1 is held by the belt 19 in the desired position. The bottle remains in this angular position up to transfer to the bottle table 8.

The holding of the bottles 1 in the transporting radial unit 4, the rotary drive for the bottles and finally their locking takes place solely through the toothed belt 19, whereby through resilient pressure and the large engagement surface, even with different bottle dimensions and friction conditions, a more reliable friction contact is insured. The rates of rotation of all brake motors 18 of the driving or operating device are constant and fast so the bottles are turned independently of the rate of rotation of the transporting radial unit 4 and the bottles are always properly aligned by the time they are positioned for being engaged by the rotating table 8 of the labeling machine.

We claim:

1. Apparatus for rotating bottles so that randomly oriented reference markers on the respective bottles assume preferred and similar angular orientations, said apparatus comprising:

a radially extending unit for being driven rotationally about an axis, said unit having a plurality of circumferentially spaced apart bottle receivers presenting recesses, respectively, in a direction radially away from said axis, a plurality of pairs of cooperating movable elements comprising a pair of levers mounted for pivoting on said unit towards and away from each other on opposite sides of each receiver, the pivot axes thereof being located between the rotational axis of said unit and a bottle receiver associated therewith, said levers in a pair diverging in the radial direction to dispose the radially remote end portions thereof on one and the other sides of a receiver, roll means on each of said levers and a closed loop belt running on said roll means, said roll means being arranged such that a portion of said belt will be on one side of a bottle that has entered the receiver and another portion of the belt will be on the other side for gripping a bottle, said roll means including a pair of radially spaced apart rolls on each lever and one of said radially spaced apart rolls being radially inward from the circle defined by the middle axis of said bottles and the other being radially outward therefrom such that said portions of the belt which grip a bottle extend between said radially spaced rolls for curing complementarily with the periphery of a bottle, slidable members on said unit, springs for pressing said members, respectively, radially inwardly and an idler roll on each member pressing against a belt under the influence of said springs at a place intermediate said belt portions that engage the two sides of a bottle, spring means for urging said diverging levers on each pair toward each other, means coupling said levers in a pair to move jointly with each other, a guide roller coupled to said means for coupling the levers, a stationary cam engaged by said guide roller such that when said guide roller is on one portion of said cam said levers are held at maximum divergence in opposition to said spring means for receiving a bottle that enters a receiver means when said rotatable unit is in one angular position and when said guide roller advances rotationally to another portion of said cam said levers swing toward each other under the influence of said spring means to cause said belt portions to grip and carry the bottle to a predetermined angular position a plurality of motor means supported from said radially extending rotatable unit and means for coupling said motor means, respectively, in driving relation with a belt, said motor means when energized causing said belt to translate and to rotate the gripped bottle, while said unit is rotating to said predetermined angular position at which said grip is released by said guide roller again engaging said one portion of the cam, a scanning device for markers, said device effecting energization of said motor means and rotation of a gripped bottle until its marker has assumed said preferred orientation and then effecting deenergization to lock the bottle against rotation up to the time the bottle is released.

* * * * *